(12) United States Patent
Maier et al.

(10) Patent No.: US 11,628,509 B2
(45) Date of Patent: Apr. 18, 2023

(54) SAW CHAIN

(71) Applicant: Andreas Stihl AG & Co. KG, Waiblingen (DE)

(72) Inventors: Georg Maier, Kernen im Remstal (DE); Thomas Frei, Will (CH); Thomas Lux, Alfdorf (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 17/308,606

(22) Filed: May 5, 2021

(65) Prior Publication Data

US 2021/0346968 A1 Nov. 11, 2021

(30) Foreign Application Priority Data

May 5, 2020 (EP) .................................... 20172954

(51) Int. Cl.
*B23D 57/02* (2006.01)
*B23D 61/18* (2006.01)

(52) U.S. Cl.
CPC ............ *B23D 57/02* (2013.01); *B23D 61/18* (2013.01)

(58) Field of Classification Search
CPC ........ B23D 57/02; B23D 61/18; B27B 33/14; F16G 7/00
USPC .......................................................... 83/830
See application file for complete search history.

(56) References Cited

U.S. PATENT DOCUMENTS

| | | | | |
|---|---|---|---|---|
| 2,365,229 A * | 12/1944 | Vanderzee | ............... | E21C 25/36 474/224 |
| 2,788,670 A * | 4/1957 | Armin | ..................... | E21C 25/36 474/225 |
| 2,798,381 A | 7/1957 | Siverson | | |
| RE24,475 E | 5/1958 | Siverson | | |
| 4,978,327 A * | 12/1990 | Wu | ......................... | F16G 13/06 474/228 |
| 5,729,882 A * | 3/1998 | Travis | ...................... | B21J 15/02 29/524.1 |
| 10,406,715 B2 | 9/2019 | Harfst et al. | | |
| 2005/0266949 A1* | 12/2005 | Kamada | .................. | F16G 13/06 474/230 |

(Continued)

FOREIGN PATENT DOCUMENTS

DE 740 549 C 10/1943
DE 43 09 464 A1 9/1994
(Continued)

*Primary Examiner* — Nhat Chieu Q Do
(74) *Attorney, Agent, or Firm* — Walter Ottesen, P.A.

(57) ABSTRACT

A saw chain includes connecting links and drive links that are mutually connected by rivets in an articulated manner about rivet axes. The rivets project through at least one rivet opening of one connecting link and through a rivet opening of a drive link. At least one rivet has, on one end face thereof, a depression having a depression edge and a depression base surrounded by the depression edge. The distance of the depression edge from a central plane of the saw chain increases at an increasing radial distance from the rivet axis. The distance (e) of the base from the central plane does not increase at any point of the base at an increasing radial distance from the rivet axis. A greatest distance (a) of the base from the rivet axis corresponds to 50% to 100% of half the core diameter (d) of the rivet.

11 Claims, 2 Drawing Sheets

(56) References Cited

U.S. PATENT DOCUMENTS

| | | | |
|---|---|---|---|
| 2008/0015071 A1* | 1/2008 | Fujiwara | F16G 13/06 474/206 |
| 2008/0081720 A1* | 4/2008 | Oishi | F16G 13/06 474/227 |
| 2014/0038759 A1* | 2/2014 | Inoue | B21L 9/065 474/234 |

FOREIGN PATENT DOCUMENTS

| | | | |
|---|---|---|---|
| DE | 4309464 A1 * | 9/1994 | B27B 33/14 |
| EP | 3 050 685 A1 | 8/2016 | |

* cited by examiner

Fig. 4

SAW CHAIN

CROSS REFERENCE TO RELATED APPLICATION

This application claims priority of European patent application no. 20 172 954.8, filed May 5, 2020, the entire content of which is incorporated herein by reference.

BACKGROUND

DE 43 09 464 A1 discloses a saw chain, the rivets of which have depressions on both end faces. The depressions are formed with a continuous radius and are comparatively large. The intention as a result is for the hole frictional pressure between rivet shank and rivet hole bore to be increased since an increased radial pressure builds up in the rivet shank during the deformation process.

SUMMARY

An object of the invention is to provide a saw chain which has a long service life.

This object is achieved by a saw chain including connecting links and drive links that are connected to one another in an articulated manner about rivet axes by rivets. The rivets project through at least one rivet opening of at least one connecting link and through a rivet opening of a drive link arranged between two connecting links. The saw chain defines a central plane which runs perpendicularly to the rivet axes and centrally through the drive links. The connecting links are partially formed as cutting links and have a cutting section. At least one rivet has a depression on at least one end face, wherein the depression has a depression edge, wherein the distance of the depression edge from the central plane of the saw chain increases at an increasing radial distance from the rivet axis, wherein the depression has a base of the depression which is surrounded by the depression edge, wherein the distance of the base of the depression from the central plane of the saw chain does not increase at any point of the base of the depression at an increasing radial distance from the rivet axis, and wherein the greatest distance of the base of the depression from the rivet axis corresponds to 30% to 100% of half the core diameter of the rivet.

The object is also achieved by a saw chain including connecting links and drive links that are connected to one another in an articulated manner about rivet axes by means of rivets, the rivets projecting through at least one rivet opening of at least one connecting link and through a rivet opening of a drive link arranged between two connecting links, the saw chain having a central plane which runs perpendicularly to the rivet axes and centrally through the drive links, the connecting links being partially formed as cutting links and having a cutting section, at least one rivet having a depression on at least one end face, wherein the rivet is configured as a solid body, and the rivet has a first end face and a second end face which differ.

It has been shown that too large a radial pressure at the rivet may lead to a reduced service life of the saw chain.

According to the invention, it is provided that the depression has a depression edge, the distance of which from the central plane of the saw chain increases at an increasing radial distance from the rivet axis. The depression also has a base of the depression which is surrounded by the depression edge, wherein the distance of the base of the depression from the central plane of the saw chain does not increase at any point of the base of the depression at an increasing radial distance from the rivet axis. The greatest distance of the base of the depression from the rivet axis corresponds to 30% to 100% of half the core diameter of the rivet.

It has been shown that, by means of the specified configuration, the radial forces acting on the opening in the adjacent connecting link can be reduced and nevertheless at the same time the rivet connection can achieve great strength. Owing to the fact that the distance of the base of the depression from the central plane of the saw chain does not increase at any point of the base of the depression at an increasing radial distance from the rivet axis, in the region of the base of the depression only comparatively small radial forces are introduced into the opening of the connecting link during the riveting. The rivet is compressed in the region around the rivet axis, which region is covered by the base of the depression, as seen in the direction of the rivet axis. High riveting forces are thereby achieved.

The half core diameter is the smallest radius of the rivet in the case of rivets having a circular cross section. In the case of rivets having a collar in the drive link, the half core diameter corresponds to the radius of the rivet in a connecting link.

The rivet can be formed separately from the two connecting links and the drive link that are connected to one another in an articulated manner by the rivet. In this case, the rivet projects in each case through rivet openings of two connecting links and through a rivet opening of a drive link arranged between the connecting links. In an alternative embodiment, it can be provided that the rivet is formed integrally with one of the connecting links and projects through a rivet opening of a drive link and through a rivet opening of the opposite connecting link. The depression is advantageously arranged on that side of a rivet on which the rivet projects through a rivet opening of a connecting link and is connected to the connecting link.

The largest distance of the base of the depression from the rivet axis advantageously corresponds to at least 50% of half the core diameter of the rivet. The specified minimum size of the base of the depression makes it possible for the forces introduced into the base of the depression during the riveting to be limited and for excessive material loadings to be thereby avoided.

In a particularly advantageous configuration, the base of the depression is curved convexly. The forces introduced during the riveting are thereby conducted in the region of the base of the depression away from the edge of the opening of the adjacent connecting link and directed toward the rivet axis. A base of the depression which runs at least in sections, in particular completely, perpendicularly to the rivet axis can also be advantageous.

The largest distance of the base of the depression from the rivet axis advantageously corresponds to at most 80% of half the core diameter of the rivet.

The largest distance of the depression from the rivet axis advantageously corresponds to at least 110% of the largest distance of the base of the depression from the rivet axis. A comparatively small increase of the depression in the region of the depression edge, that is, a small increase in the distance of the depression edge from the central plane at an increasing distance from the rivet axis, is thereby achieved. The comparatively small increase of the depression in the region of the depression edge ensures a favorable introduction of force.

The depth of the depression is preferably comparatively small. The depth of the depression is measured parallel to the rivet axis. The depth of the depression is the difference of the largest distance of the depression edge from the central plane and of the smallest distance of the base of the depression from the central plane. The depth of the depression is advantageously smaller than the largest distance of the base of the depression from the rivet axis. The depth of the depression is in particular less than 40%, advantageously less than 30%, of the largest distance of the base of the depression from the rivet axis. The depression is advantageously comparatively shallow.

At least one end face of a rivet is advantageously formed on a rivet head with an enlarged outer diameter, the rivet head projecting over the outer surface of the associated connecting link. The depression lies in particular at least partially outside the plane of the outer surface of the associated connecting link. The depression preferably lies completely outside the plane of the outer surface of the associated connecting link. The associated connecting link here is the connecting link which is arranged on the same side of the chain as the rivet head. The rivet head lies in particular on the associated connecting link. In an alternative embodiment, it can be provided that the end face of the rivet lies flush in the outer surface of the associated connecting link or is offset in relation to the outer surface toward the central plane of the saw chain. The depth of the depression is in particular smaller than a height of the rivet head, as measured in the direction of the rivet axis. The depth of the depression is in particular less than 50%, advantageously less than 30% of the height of the rivet head.

The ratio of half the enlarged outer diameter of the rivet head to the largest distance of the base of the depression from the rivet axis is advantageously from 1.5 to 3.5. The ratio of half the enlarged outer diameter of the rivet head to the largest distance of the base of the depression from the rivet axis is particularly advantageously from 2 to 3.5.

The connecting link advantageously has a chamfer at the rivet opening. The chamfer is arranged in particular on the outer side of the rivet opening, that is, on that side of the rivet opening which faces away from the central plane. The depth of the chamfer at the rivet opening of the connecting link is advantageously comparatively small. The depth of the chamfer at the rivet opening is advantageously at most 30%, in particular at most 20% of the thickness of the connecting link. The largest diameter of the chamfer, the largest diameter being arranged on the outer side of the connecting link, is thereby also comparatively small. For a rivet with a rivet head, it is advantageously provided that the rivet head completely covers the chamfer. The enlarged outer diameter of the rivet head is advantageously at least 120% of the largest diameter of the chamfer. The largest distance of the base of the depression from the rivet axis is advantageously at least 20%, in particular at least 40% of half the largest diameter of the chamfer.

The rivet is advantageously a collar pin. The rivet advantageously has a collar which is arranged in the rivet opening of the drive link. The collar advantageously does not project into the rivet openings of the connecting links. A sufficient distance between the two connecting links through which the collar pin projects can be ensured in a simple manner by the collar pin.

An independent inventive concept relates to the configuration of the two end faces of a rivet. The rivet is advantageously configured as a solid body and has a first and a second end face which differ. By means of a rivet with a different first and second end face, different forces which act on the two end faces of the rivet, or other influences on the riveting, the influences acting differently on the two end faces of the rivet, can be at least partially compensated for.

It has been shown in particular that the forces acting on the saw chain during operation can be different on either side of the saw chain, for example because of the arrangement of the drive unit or of the handles via which the forces are introduced during operation. The cutting links also introduce lateral forces into the saw chain, which may lead to an asymmetric loading of the saw chain in the region of the respective cutting link. It has now been shown that a greater service life of the saw chain can be achieved by end faces of a rivet head being configured differently.

In an advantageous manner, the second end face has the depression, and the first end face does not have a depression. However, it can also be provided that the two end faces have differently configured depressions.

In an advantageous manner, the first end face is formed on a first rivet head and the second end face on a second rivet head. The rivet heads advantageously project in each case here over the outer surface of the associated connecting link. The height of the second rivet head, as measured in the direction of the rivet axis, is advantageously larger than the height of the first rivet head, as measured in the direction of the rivet axis. Accordingly, in an advantageously configuration, the two rivet heads differ in height. The heights of the rivet heads are measured with respect to the plane of the outer surface of the associated connecting link. In a particularly advantageous manner, the second rivet head of greater height is the rivet head, the end face of which has the depression, and the first rivet head is the rivet head of smaller height, which does not have a depression.

In a preferred configuration, the first end face is convex.

In an advantageous configuration, the curvature of the first end face in the region of the diameter of the base of the depression is mirror-symmetrical to the curvature of the base of the depression in the same region of the diameter on the second end face. As a result, in the region of the diameter in which a base of the depression is arranged on one end face, similar or approximately identical forces are introduced into the rivet on both end faces.

The difference of the distance of the first end face at the intersection of the rivet axis with the first end face from the central plane and of the distance of the second end face at the intersection of the rivet axis with the second end face from the central plane is advantageously less than 0.3 mm. The distances are preferably approximately identical. The difference between the distances is in particular less than 0.1 mm. Particularly preferably, the distances are identical in size within the scope of the manufacturing tolerances. The center points of the end face of a rivet are advantageously approximately at the same distance from the central plane.

In an advantageous manner, all the end faces on one side of the saw chain are first end faces and all end faces on an opposite, second side of the chain are second end faces. It has turned out to be particularly preferred for a saw chain which is operated with a hand held power saw if the end faces on a right side of the chain, arranged on the right in the running direction, are first end faces, and the end faces which are arranged on the left side of the chain, which is arranged on the left in the running direction, are second end faces.

BRIEF DESCRIPTION OF THE DRAWINGS

The invention will now be described with reference to the drawings wherein:

FIGS. 1 and 2 show perspective illustrations of an embodiment of a saw chain;

FIGS. 3 and 4 show side views of the saw chain from FIGS. 1 and 2;

DESCRIPTION OF THE PREFERRED EMBODIMENTS OF THE INVENTION

Figures 1, 2, 3, 4:
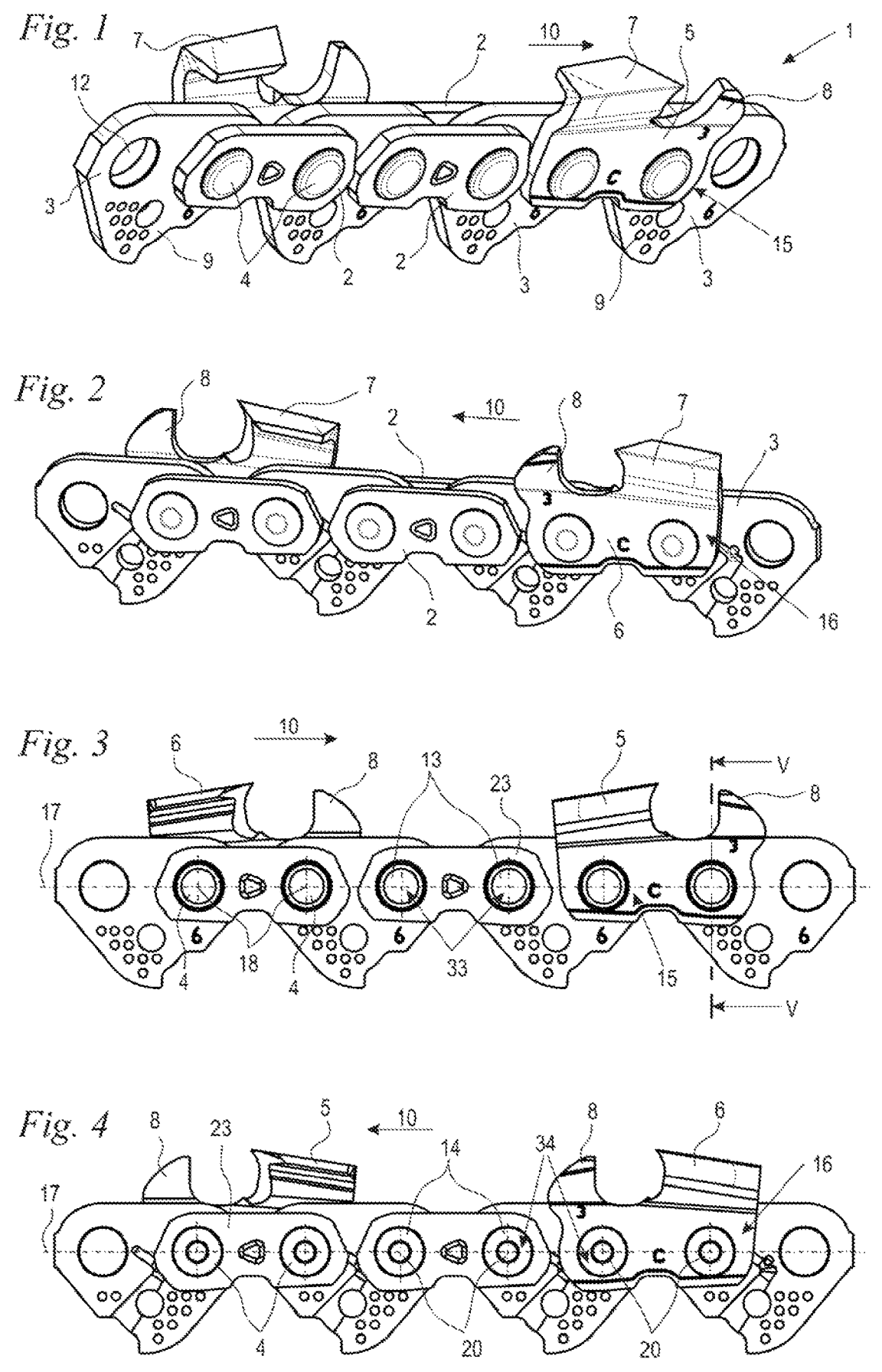
Figure 5:
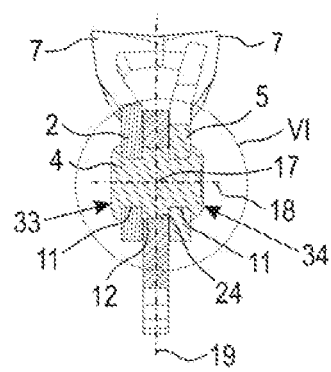
FIG. 5 shows a section along the line V-V from FIG. 3.

FIG. 1 shows a saw chain 1 in a perspective illustration. During operation, the saw chain 1 moves in a running direction 10. FIG. 1 shows a view of a right side of the chain 15. FIG. 2 shows a view of the opposite left side of the chain 16. The saw chain comprises connecting links 2 and drive links 3. The drive links 3 each have a drive base 9 which is provided for engagement in a guide bar of a power saw. The saw chain 1 is to be driven at the drive base 9, for example, via a drive sprocket. The drive links 3 each have two rivet openings 12. Rivets 4 which connect the drive links 3 to the connecting links 2 in an articulated manner project through the rivet openings 12. Each rivet 3 projects through two connecting links 2 and through a drive link 3 arranged between the two connecting links 2.

The connecting links 2 are partially configured as cutting links 5, 6. Right cutting links 5 are arranged here on the right side of the chain 15 and left cutting links 6 on the left side of the chain 16 (FIG. 2). The cutting links 5, 6 each have a cutting section 7. The cutting section 7 can have a geometrically defined or a geometrically nondefined cutting geometry. In the embodiment, the cutting section 7 is provided for machining a workpiece, in particular made from wood. The cutting section 7 has a geometrically defined cutting geometry. In an alternative embodiment, it can be provided that the cutting section 7 is configured for grinding a workpiece, in particular a workpiece made from concrete. The cutting edges of the cutting section 7 can be formed, for example, from a multiplicity of abrasive grains, for example from diamond. In this case, the geometry of the cutting edges is geometrically undefined.

In the embodiment, a depth delimiter 8 is arranged ahead of each cutting section 7. In the embodiment, the depth delimiter 8 and the following cutting section 7 are arranged on the same cutting link 5, 6.

The terms "right side of the chain 15" and "left side of the chain 16" relate to a view of the saw chain from above looking at the cutting sections 7, that is, from the cutting sections 7 in the direction of the drive bases 9. In this viewing direction, the right side of the chain 15 is arranged on the right and the left side of the chain 16 on the left in the running direction.

As FIGS. 1 and 2 also show, a pair of connecting links 2, in which a connecting link 2 is configured as a left cutting link 6, is followed in the running direction 10 by a pair of connecting links 2 without a cutting section, and then by a pair of connecting links 2, in which a connecting link 2 is configured as a right cutting link 5. Pairs of connecting links 2 with a cutting section alternate in the running direction 10 with pairs of connecting links 2 without a cutting section 7. Right cutting links 5 and left cutting links 6 alternate in the running direction 10.

A different configuration of the saw chain 1 can also be advantageous.

As FIGS. 3 and 4 show, the saw chain 10 has a longitudinal center axis 17. When the saw chain 1 is elongated, the longitudinal center axis 17 runs parallel to the running direction 10. Each rivet 4 has a rivet axis 18. The rivet axis 18 corresponds to the pivot axis about which the rivet 4 connects the connecting links 2 in an articulated manner to the drive link 3 arranged in between. If one section of the saw chain 1 is stretched, all the rivet axes 18 of the stretched section of the saw chain 1 intersect the longitudinal center axis 17 of the saw chain 1.

As FIG. 3 shows, the rivets 4 have end faces 33 on the right side of the chain 15. In the embodiment, the end faces 33 of all the rivets 4 on the right side of the chain 15 are formed without depressions. In the embodiment, the end faces 33 are formed on right rivet heads 13.

As FIG. 4 shows, the rivets 4 in the embodiment form left rivet heads 14 on the left side of the chain 16. The rivets 4 have a second end face 34 on the left side of the chain 16. In the embodiment, all the rivets 4 have a depression 20, which will be explained in more detail below, on the second end face 34.

Figure 6:
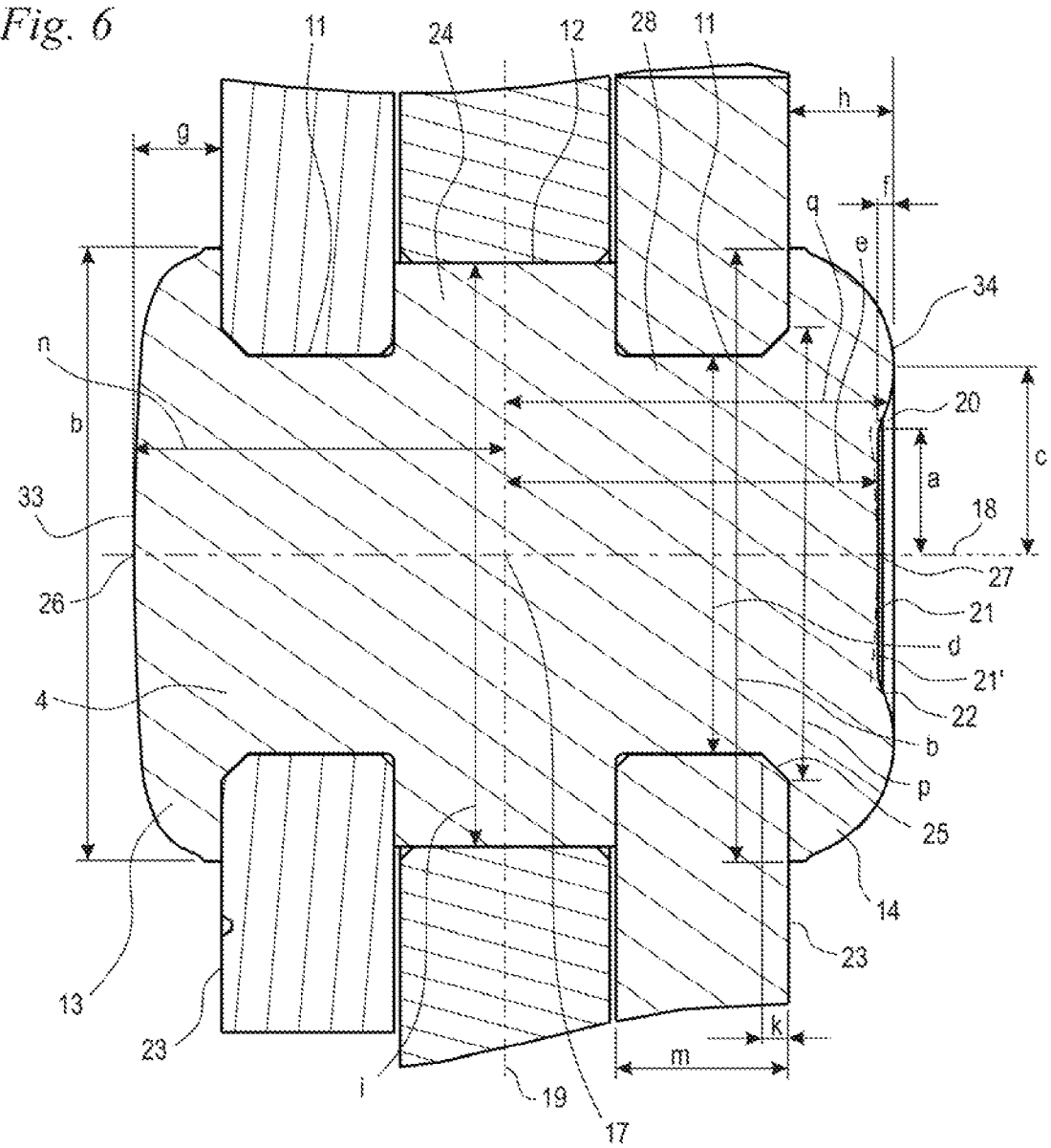
FIG. 6 shows the detail VI from FIG. 5 in an enlarged illustration.

At the rivet heads 13, 14, the rivets 4 have an enlarged outer diameter b (FIG. 6). The rivet heads 13, 14 each project beyond an outer surface 23 of the associated connecting link 2. In an alternative embodiment, it can be provided that one or both rivet heads 13, 14 lies or lie flush with the outer surface 23 of the associated connecting link 2. It can be provided that one or both rivet heads 13, 14 are offset back with respect to the outer surface 23 of the associated connecting link 2.

FIG. 5 shows a section through a rivet 4. In the sectional illustration of FIG. 5, one of the connecting links 2 is a right cutting link 5. The saw chain 1 has a central plane 19. The central plane 19 runs perpendicularly to the rivet axes 18 and centrally through the drive links 3. The central plane 19 accordingly lies parallel to the plane of the drive links 3. When the saw chain 1 is stretched, the central plane 19 and the rivet axes 18 intersect in the longitudinal center axis 17. As FIG. 5 also shows, the connecting links have rivet openings 11. The rivet 4 projects through the rivet opening 12 of the drive link 3 and through the rivet openings 11 of the two connecting links 2 arranged on either side of the drive link 3. The rivet openings 11 in the connecting links 2 are smaller than the rivet opening 12 in the drive link 3. The rivet 4 has a collar 24 at which the outer diameter of the rivet 4 is enlarged. The collar 24 extends in the rivet opening 12 of the drive link 3. The collar 24 does not project into the rivet openings 11 of the adjacent connecting links 2.

As FIG. 6 shows, the rivet 4 has a core diameter d. The diameter of the rivet openings 11 of the connecting links 2 approximately corresponds to the core diameter d. In the embodiment, the rivet 4 has a circular cross section. The rivet 4 is rotationally symmetrical with respect to the rivet axis 18. A non-rotationally-symmetrical configuration of the rivet 4, in particular of sections of the rivet 4, may also be advantageous. The rivet 4 has a diameter i at the collar 24. The diameter i is larger than the core diameter d. The diameters of the rivet openings 11 and 12 are coordinated with the core diameter d and the diameter i at the collar 24. The diameter of the pivot opening 11 is smaller than the diameter i at the collar 24, and therefore the collar 24 cannot project into the rivet openings 11 of the connecting links 2.

As FIG. 6 shows, the rivet 4 is configured as a solid body. The rivet 4 is accordingly not a hollow rivet. The rivet 4 extends through the rivet openings 11 and 12 and, in the embodiment, is formed separately from the two connecting links 2 and the drive link 3. The rivet 4 is accordingly not a rivet element which is molded on a connecting link 2, that is, formed integrally therewith. The rivet 4 is shaped on both end faces 33 and 34 during the production of the saw chain 1. The rivet 4 is thereby fixedly connected to the connecting links 2.

In an alternative embodiment, the rivet 4 on its first end face 33 is formed integrally with the connecting link 2. The rivet 4 at the end face 33 is formed integrally with the adjacent connecting link 2. On the opposite side, the rivet 4 projects through the rivet opening 11 of the opposite connecting link 2. This connecting link 2 is formed separately from the rivet 4 and is connected to the latter by a riveting process. A rivet head 14 is arranged on this side of the rivet 4. The depression 20 is arranged on the second end face 34. The depression 20 is provided on the rivet head 14 at which the rivet 4 is connected by riveting to a connecting link 2 formed separately from the rivet 4. The depression 20 is arranged on that side of the rivet 4 on which the rivet 4 projects through a rivet opening 11 of a connecting link 2. The torsional strength of the rivet 4 in the rivet opening 11 of the connecting link 2 can be influenced by the depression 20. One side of the rivet 4 is formed integrally with a connecting link 2 and the other side of the rivet 4 has the depression 20.

In the embodiment, the enlarged diameter b of the rivet heads 13 and 14 is larger than the core diameter d. The outer surfaces 23 of the connecting links 2 lie facing away from the central plane 19. The rivet heads 13 and 14 project over the outer surface 23 of the respectively adjacently arranged connecting link 2. Adjacent to the outer surface 23, the connecting links 2 each have a chamfer 25. It can also be provided that only one of the connecting links 2 has a chamfer 25, or that the chamfers 25 of the two connecting links 2 differ. The chamfers 25 have a largest outer diameter p adjacent to the outer surface 23. The diameter b of the rivet heads 13 and 14 is advantageously larger than the outer diameter p at the chamfer 25. The rivet heads 13 and 14 thereby completely cover the rivet openings 11 in the direction of the rivet axis 18. The enlarged outer diameter b of the rivet head 13, 14 is advantageously at least 120% of the largest diameter p of the chamfer 25.

It is provided that at least one end face 33, 34 of the rivet 4 has a depression 20. In the embodiment, a depression 20 is provided on the second end face 34. The first end face 33 does not have a depression 20. The depression 20 has a base of the depression 21 and a depression edge 22. The depression edge 22 surrounds the base of the depression 21. The rivet axis 18 intersects the base of the depression 21. In the embodiment, the base of the depression 21 and the depression edge 22 are formed rotationally symmetrically about the rivet axis 18. However, an asymmetrical configuration with respect to the rivet axis 18 may also be provided.

The base of the depression 21 is that region of the depression 20 in which a distance e of the base of the depression 21 from the central plane 19 does not increase at any point of the base of the depression 21 at an increasing radial distance from the rivet axis 18. The largest distance e of the base of the depression 21 from the central plane 19 is therefore at least also at the intersection of the base of the depression 21 with the rivet axis 18. The distance e is measured parallel to the rivet axis 18. The intersection of the base of the depression 21 with the rivet axis 18 corresponds to the intersection 27 of the second end face 34 with the rivet axis 18. The base of the depression 21 is at a largest distance a from the rivet axis 18. In the embodiment, the largest distance a corresponds to half the diameter of the base of the depression 21. The largest distance a is measured in the radial direction with respect to the rivet axis 18. The distance a corresponds to the maximum radial distance of the base of the depression 21 from the rivet axis 18. The largest distance a of the base of the depression 21 from the rivet axis 18 corresponds to at least 30%, in particular at least 50% of half the core diameter d of the rivet 4. The base of the depression 21 thereby provides a sufficiently large area for introducing forces into the rivet 4 approximately in the direction of the rivet axis 18 during the riveting. The largest distance a of the base of the depression 21 from the rivet axis 18 corresponds at most to 100% of half the core diameter d of the rivet 4. The base of the depression 21 accordingly does not extend in the radial direction with respect to the rivet axis 18 beyond a rivet section 28 which is arranged in the rivet opening 11 of the connecting link 2. The largest distance a of the base of the depression 21 from the rivet axis 18 corresponds at most to 80% of half the core diameter d of the rivet 4.

The largest distance a of the base of the depression 21 from the rivet axis 18 is advantageously at least 20%, in particular at least 40% of half the largest diameter p of the chamfer 25.

It can be provided that the base of the depression 21 runs partially or completely in a flat manner. This is illustrated by a solid line in FIG. 6. Alternatively, a convexly curved base of the depression 21', which is illustrated schematically by a dashed line in FIG. 6, can also be provided. The curvature of the base of the depression 21' can have a very large radius here. The radius by which the base of the depression 21' is curved at the intersection 27 is advantageously larger than the core diameter d, in particular larger than the diameter b of the rivet head 14.

The depression edge 22 is at a distance q from the central plane 19 that increases radially outward from the base of the depression 21. In FIG. 6, the distance q is shown schematically for a central region of the depression edge 22. The distance q is measured parallel to the rivet axis 18.

The depression 20 is at a largest distance c from the rivet axis 18. In the case of a symmetrical configuration, the largest distance c corresponds to half the diameter of the depression 20. The largest distance c of the depression 20 from the rivet axis 18 advantageously corresponds to at least 110% of the largest distance a of the base of the depression 21 from the rivet axis 18. The largest distance c of the depression 20 from the rivet axis 18 advantageously corresponds to 70% to 120% of half the core diameter d of the rivet 4. Half the core diameter d corresponds to the core radius d/2. The depression 20 advantageously projects in the radial direction with respect to the rivet axis 18, in the viewing direction of the rivet axis 18, beyond the rivet section 28 in which the core diameter d is measured. Half the enlarged outer diameter b of the rivet head 14 is preferably 1.5 times to 3.5 times, in particular 2 times to 3.5 times the largest distance a.

The left rivet head 14 has a height h, as measured parallel to the rivet axis 18. The height h is advantageously greater than a depth f of the depression 20, as measured parallel to the rivet axis 18. The depth f is in particular less than 50%, in particular less than 30% of the height h. The depth f of the depression 20 is advantageously smaller than the largest distance a of the base of the depression 21 from the rivet axis 18. The depth f is preferably less than 40%, in particular less than 30% of the largest distance a.

The connecting link 2 has a thickness m, as measured parallel to the rivet axis 18. The chamfer 25 has a depth k, as measured in the same direction. The depth k is advantageously at most 30%, in particular at most 20% of the thickness m of the connecting link 2.

In the embodiment, the two rivet heads 13 and 14 differ. In the embodiment, the right rivet head 13 does not have a depression 20. The end face 33 intersects the rivet axis 18 at an intersection 26. The end face 33 is at a distance n from the central plane 19. Starting from the intersection 26, the distance n is reduced at an increasing radial distance from the rivet axis 18. In FIG. 6, a distance n in the vicinity of the rivet axis 18 is shown by way of example. In the embodiment, the diameters b of the two rivet heads 13 and 14 are identical in size. The right rivet head 13 has a height g which is measured parallel to the rivet axis 18. In the embodiment, the height g of the right rivet head 13 is smaller than the height h of the left rivet head 14 which has the depression 20. The first end face 33 runs convexly. The curvature of the first end face 33 in the region of the diameter of the base of the depression 21' is mirror-symmetrical with respect to the curvature of the base of the depression 21' in the same region of the diameter on the second end side 34. The curvature of the base of the depression 21' is illustrated in exaggerated form in FIG. 6 for the purpose of providing a better illustration. In actual fact, the curved base of the depression 21' has a shallower profile than illustrated.

The distance n of the intersection 26 on the first end face 33 and the distance e of the intersection 27 on the second end face 34 from the central plane 19 are preferably approximately equal in size. The difference between the distances n and e on the intersections 26 and 27 is advantageously less than 0.3 mm, in particular less than 0.1 mm. The distances n and e are preferably identical in size in the scope of the manufacturing tolerances.

The above-described configuration of rivets 4 can also be provided for differently constructed saw chains 1.

It is understood that the foregoing description is that of the preferred embodiments of the invention and that various changes and modifications may be made thereto without departing from the spirit and scope of the invention as defined in the appended claims.

What is claimed is:

1. A saw chain defining a center plane and comprising:
a plurality of connecting links and a plurality of drive links arranged between mutually adjacent ones of said connecting links;
a plurality of rivets defining respective rivet axes;
said plurality of rivets connecting said plurality of connecting links and said plurality of drive links in an articulated manner about said rivet axes;
each of said plurality of connecting links and each of said plurality of drive links having rivet openings;
said plurality of rivets projecting through corresponding ones of said rivet openings of corresponding ones of said plurality of connecting links and through corresponding ones of said rivet openings of said plurality of drive links;
said center plane running perpendicularly to said rivet axes and centrally through said plurality of drive links;
selected ones of said plurality of connecting links being configured as cutting links with said cutting links having respective cutting sections;
said plurality of rivets each having end faces defining an end face plane and a core diameter (d);
at least one of said plurality of rivets having a depression formed in at least one of the end faces thereof;
said depression having a depression edge at a distance (q) from said center plane;
said distance (q) increasing with an increasing radial distance from the rivet axis;
said depression having a depression base surrounded by said depression edge;
said depression base being at a distance (e) from said center plane with said distance (e) not increasing at any point of said depression base with an increasing radial distance from the rivet axis;
said depression base having a central portion curved convexly when viewed along the rivet axis toward said outer end face of the rivet;
said depression base having a greatest distance (a) to the rivet axis lying in a range of 30% to 100% of half of said core diameter (d) of the rivet;
at least one end face of at least one of said plurality of rivets being formed on a rivet head having an enlarged outer diameter (b);
said rivet head projecting over an outer surface of the corresponding one of said plurality of connecting links associated therewith; and,
the ratio of half said enlarged outer diameter (b) of said rivet head to the greatest distance (a) of said depression base from said rivet axis being 1.5 to 3.5.

2. The saw chain of claim 1, wherein said greatest distance (a) of said depression base lies in a range of 30% to 80% of half of said core diameter (d) of the rivet.

3. The saw chain of claim 1, wherein a greatest distance (c) of said depression to the rivet axis corresponds to at least 110% of said greatest distance (a) of said depression base to the rivet axis.

4. The saw chain of claim 1, wherein said depression has a depth (f) measured parallel to the rivet axis which is less than said greatest distance (a) of said depression base from the rivet axis.

5. The saw chain of claim 4, wherein said depth (f) is less than 40% of said greatest distance (a).

6. The saw chain of claim 4, wherein said depth (f) is less than 30% of said greatest distance (a).

7. The saw chain of claim 1, wherein the connecting link has a chamfer formed at the rivet opening thereof; and, the chamfer has a depth (k) which is at most 30% of the thickness of the connecting link.

8. The saw chain of claim 7, wherein said depth (k) is at most 20% of the thickness of the connecting link.

9. The saw chain of claim 1, wherein said one of said plurality of rivets has a collar arranged in the rivet opening of the drive link without projecting into the rivet opening of the plurality of connecting links.

10. A saw chain defining a center plane and comprising:
a plurality of connecting links and a plurality of drive links arranged between mutually adjacent ones of said connecting links;
a plurality of rivets defining respective rivet axes;
said plurality of rivets connecting said plurality of connecting links and said plurality of drive links in an articulated manner about said rivet axes;
each of said plurality of connecting links and each of said plurality of drive links having rivet openings;
said plurality of rivets projecting through corresponding ones of said rivet openings of corresponding ones of said plurality of connecting links and through corresponding ones of said rivet openings of said plurality of drive links;
said center plane running perpendicularly to said rivet axes and centrally through said plurality of drive links;
selected ones of said plurality of connecting links being configured as cutting links with said cutting links having respective cutting sections;

said plurality of rivets each having a core diameter (d) and an outer end face defining an end face plane;

at least one of said plurality of rivets having a depression formed in at least one of the end faces thereof;

said depression having a depression edge at a distance (q) from said center plane;

said distance (q) increasing with an increasing radial distance from the rivet axis;

said depression having a depression base surrounded by said depression edge;

said depression base being at a distance (e) from said center plane with said distance (e) not increasing at any point of said depression base with an increasing radial distance from the rivet axis;

said depression base having a greatest distance (a) to the rivet axis lying in a range of 30% to 100% of half of said core diameter (d) of the rivet; and, said depression base having a central portion curved convexly when viewed along the rivet axis toward said outer end face of the rivet.

11. A saw chain defining a center plane and comprising:

a plurality of connecting links and a plurality of drive links arranged between mutually adjacent ones of said connecting links;

a plurality of rivets defining respective rivet axes;

said plurality of rivets connecting said plurality of connecting links and said plurality of drive links in an articulated manner about said rivet axes;

each of said plurality of connecting links and each of said plurality of drive links having rivet openings;

said plurality of rivets projecting through corresponding ones of said rivet openings of corresponding ones of said plurality of connecting links and through corresponding ones of said rivet openings of said plurality of drive links;

said center plane running perpendicularly to said rivet axes and centrally through said plurality of drive links;

selected ones of said plurality of connecting links being configured as cutting links with said cutting links having respective cutting sections;

said plurality of rivets each having end faces defining an end face plane and a core diameter (d);

at least one of said plurality of rivets having a depression formed in at least one of the end faces thereof;

said depression having a depression edge at a distance (q) from said center plane;

said distance (q) increasing with an increasing radial distance from the rivet axis;

said depression having a depression base surrounded by said depression edge;

said depression base being at a distance (e) from said center plane with said distance (e) not increasing at any point of said depression base with an increasing radial distance from the rivet axis;

said depression base having a greatest distance (a) to the rivet axis lying in a range of 30% to 100% of half of said core diameter (d) of the rivet;

wherein said depression base has a depth (f) measured from said end face plane and parallel to the rivet axis;

wherein said rivet head has an elevation (h) measured from an outer surface of the connecting link associated therewith and in the direction of the rivet axis;

wherein at least one end face of a rivet is formed on a rivet head having an enlarged outer diameter (b);

said rivet head projects over said outer surface of the connecting link associated therewith by said elevation (h);

wherein said depth (f) of said depression is less than 30% of said elevation (h) of said rivet head so as to cause said depression base to lie outwardly in spaced relationship above a plane defined by said outer surface of the connecting link associated therewith; and, said depression base having a central portion curved convexly when viewed along the rivet axis toward said outer end face of the rivet.

* * * * *